(12) United States Patent
Neun et al.

(10) Patent No.: US 11,550,864 B2
(45) Date of Patent: Jan. 10, 2023

(54) SERVICE GRAPH FOR LOCATION-BASED SEARCHING

(71) Applicant: HERE Global B.V., Eindhoven (NL)

(72) Inventors: Moritz Neun, Zurich (CH); Craig Barnes, Forest Park, IL (US)

(73) Assignee: HERE GLOBAL B.V., Eindhoven (NL)

( * ) Notice: Subject to any disclaimer, the term of this patent is extended or adjusted under 35 U.S.C. 154(b) by 7 days.

(21) Appl. No.: 17/108,707

(22) Filed: Dec. 1, 2020

(65) Prior Publication Data

US 2022/0171820 A1 Jun. 2, 2022

(51) Int. Cl.
*G06F 7/00* (2006.01)
*G06F 16/9537* (2019.01)
*G06F 16/2457* (2019.01)
*G06F 16/2453* (2019.01)

(52) U.S. Cl.
CPC .... *G06F 16/9537* (2019.01); *G06F 16/24545* (2019.01); *G06F 16/24578* (2019.01)

(58) Field of Classification Search
CPC ........... G06F 16/9537; G06F 16/24545; G06F 16/24578
USPC .................................. 707/602, 718, 999.002
See application file for complete search history.

(56) References Cited

U.S. PATENT DOCUMENTS

| | | | | |
|---|---|---|---|---|
| 11,269,930 B1* | 3/2022 | Davis | ...................... | G06F 16/29 |
| 2008/0010259 A1* | 1/2008 | Feng | ................... | G06F 16/9537 |
| 2011/0087685 A1* | 4/2011 | Lin | ...................... | G06F 16/9537 |
| | | | | 707/765 |
| 2015/0254357 A1* | 9/2015 | Thota | ................... | G06F 16/9535 |
| | | | | 707/706 |
| 2016/0140228 A1* | 5/2016 | Cohen | ................... | G06F 16/951 |
| | | | | 707/708 |
| 2016/0356602 A1* | 12/2016 | Puana | ................. | G01C 21/3673 |
| 2018/0089227 A1* | 3/2018 | Reddy | ................. | G06F 16/9537 |

\* cited by examiner

*Primary Examiner* — Md I Uddin
(74) *Attorney, Agent, or Firm* — Jeffrey R. Moisan; Here Global B.V.

(57) ABSTRACT

System and methods are provided for executing queries across multiple services and data sources using a Service Graph. The Service Graph is customizable and trainable using continuous feedback loops among the various components of the Service Graph. The Service Graph is configured to select at least one data source or at least one location service from a plurality heterogeneous data sources and location services, generate an execution strategy for searching the at least one location service or the at least one data source, and provide the results generated as a result of the execution strategy.

14 Claims, 9 Drawing Sheets

SERVICE GRAPH FOR LOCATION-BASED SEARCHING

FIELD

The following disclosure relates to navigation devices or services.

BACKGROUND

Location-based services provide information to individuals based on a geographic location, typically through wireless communication networks and clients such as portable computers, personal digital assistants, mobile phones, and in-vehicle navigation systems. Some of the most common applications for location-based services include local news, directions, points of interest, directory assistance, fleet management, emergency, asset tracking, location-sensitive building, and local advertisement among others. These highly specialized services traditionally require handcrafted data, algorithms, APIs, and infrastructure.

Location-based services use an engine that understands complex relationships among locations, people and assets and provides effective ways to accurately pinpoint them on the map. In an example, a location-based service might include hyper-precise point addresses while enabling display of roof-top and navigable positions. One application for location-based services is location-based searching. Location based searching includes a reference location in a query that limits the results to a geographic region. A location-based search service may use full, partial, or structured input, and utilize an advanced matching algorithm to assure what is entered accurately matches the map. The local based search and discovery may be provided using simple input text to search. Information such as the name and the type of POI, whether it is a coffee shop or post office, for example is quickly provided, as well as a variety of ways to interact with it. The service also gives access to autosuggest functionality to provide fast suggestions as the user types for places, addresses, chain queries or category queries. Searching for either addresses or POIs/Places is also supported even when the address is incomplete.

While these services are currently sufficient, the development of conversational systems and big data has changed user expectations, particularly around search. A large volume of data—both structured and unstructured—is collected on a day to day basis. This data includes larger, more varied, and more complex data sets, especially from new data sources. Searches may need to combine these varied data sources to return information-rich results in a consistent format. There is a need for an ability to access and apply data from multiple sources and services without sacrificing speed or accuracy of the search engine.

SUMMARY

In an embodiment, a method is provided for location-based searching across heterogeneous data sources and location services. The method includes receiving, by a processor, a location-based query; generating, by the processor using an ontology, an executable logical form for the location-based query; selecting, by the processor based on the executable logical form, at least one data source or at least one location service from a plurality heterogeneous data sources and location services, the at least one location service or at least one data source containing data relevant to the location-based query; generating and implementing, by the processor, an execution strategy for searching the at least one location service and/or the at least one data source; and providing, by the processor, results generated as a result of the execution strategy.

In an embodiment, a system is provided for location-based searching across heterogeneous data sources and location services. The system includes a search interface, a service registry, a service selector, an execution planner, an executor, and a ranker. The search interface is configured to receive a location-based query. The service registry is configured to store meta-data for a plurality of heterogeneous data sources and location services. The service selector is configured to select at least one data source or at least one location service from the plurality of heterogeneous data sources and location services for the location-based query based on the stored meta-data. The execution planner is configured to generate an execution strategy for the one or more data sources or the one or more location services. The executor is configured to implement the execution strategy. The ranker is configured to rank the results from the executor.

In an embodiment, an apparatus is provided that includes at least one processor and at least one memory including computer program code for one or more programs. The at least one memory is configured to store the computer program code configured to, with the at least one processor, cause the at least one processor to: receive a location-based query; generate an executable logical form for the location-based query; select, based on at least a location reference included in the executable logical form, at least one data source or at least one location service from a plurality heterogeneous data sources and location services, the at least one location service or data source containing data relevant to the location-based query; generate an execution strategy for searching the at least one location service or the at least one data source; implement the execution strategy; and provide results generated as a result of the execution strategy.

BRIEF DESCRIPTION OF THE DRAWINGS

Exemplary embodiments of the present invention are described herein with reference to the following drawings.

DETAILED DESCRIPTION

Figure 1:
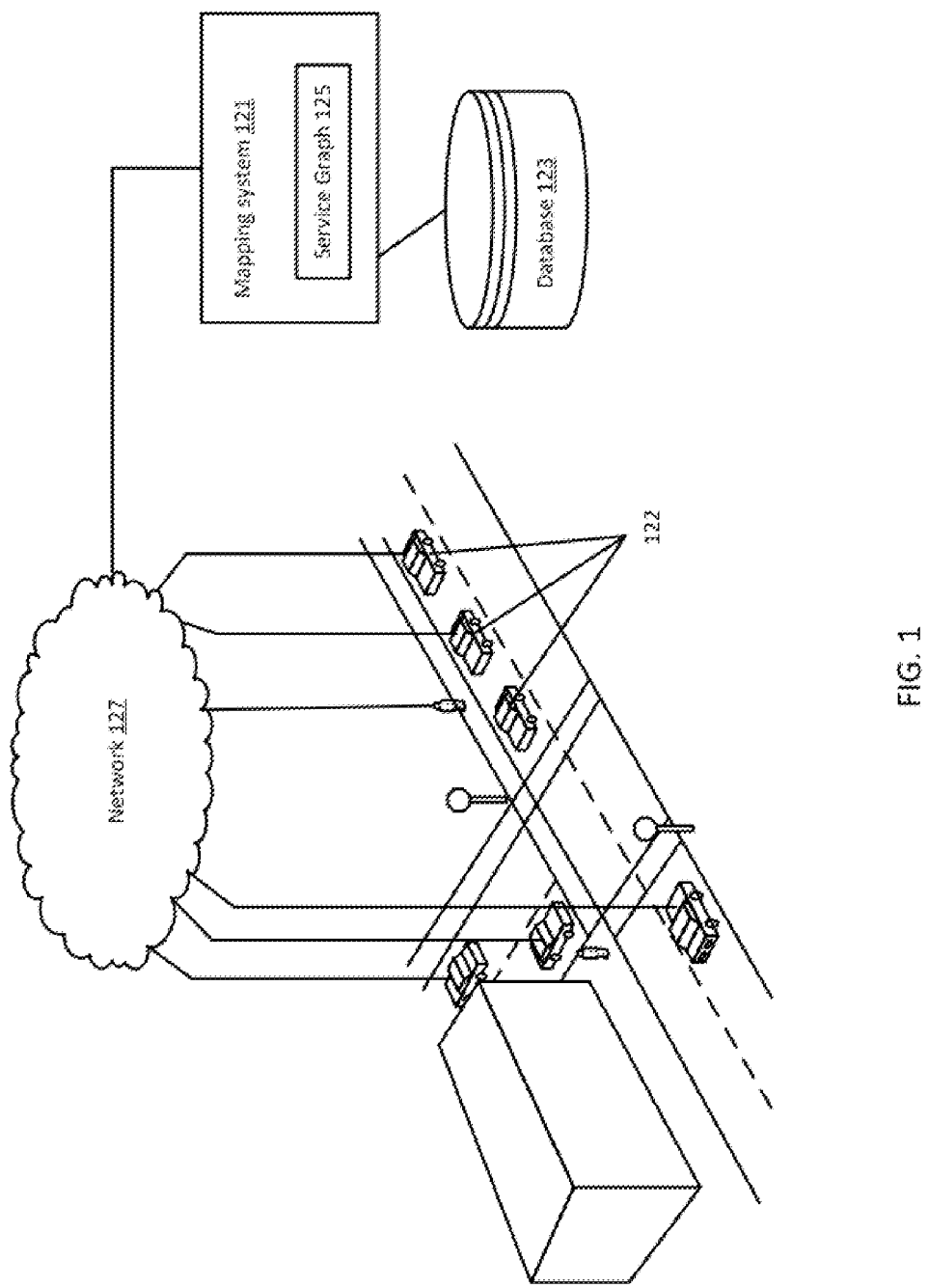
FIG. 1 depicts an example system for location-based searching according to an embodiment.

Embodiments described herein provide systems and methods for executing queries across multiple services and data sources using a Service Graph. The Service Graph is customizable and trainable using continuous feedback loops among the various components of the Service Graph.

A federated query is the ability to take a query and provide solutions based on information from many different sources. One example of a federated search retrieves information from a variety of sources via a search application built on top of multiple search engines. A user makes a single query request that is distributed to the search engines, databases, or other query engines participating in the federation. The federated search then aggregates the results that are received from the search engines for presentation to the user. The use of a federated search allows for searching multiple disparate content sources with one query. This allows a user to search multiple databases at once in real time, arrange the results from the various databases into a useful form and then present the results to the user. The federated query is thus an information aggregation or integration approach that provides single point access to many information resources, and typically returns the data in a standard or partially homogenized form. A federated search typically provides a single real-time view of all sources to the extent they are all online and available.

One issue with federated searches is scalability. It is difficult to maintain the performance and the response speed of a federated search engine as more and more information sources are used. Another challenge is supporting a robust query. A federated search may have to restrict itself to the minimal set of query capabilities that are common to all sources. Another challenge is availability of the sources. As the number of sources grows, the likelihood of one or more slow or unavailable sources becomes high. Response times may be dictated by the slowest federate of the bunch as the federated search must decide when to consider a federate unavailable or wait for a slow response.

Embodiments provide an architecture to execute federated location-based queries across multiple heterogeneous data sources and services and merge results in a standardized form. Embodiments are generalizable and trainable using feedback and machine learning in order to select sources and services to maintain efficient operations and return quality results. Continuous feedback loops are implemented among the various components to allow the system to learn how it composes database and service calls, conflates, and merges the multiple responses and rank the results. Embodiments allow developers to design their domain-specific services by combining internal data and external data in a consistent format. This permits a lower barrier to entry for developers than having to handle multiple independent services and data.

Embodiments provide improved location services that are configurable, feedback-based, and that can answer a broader range of questions than the current generation of location services. Embodiments provide an increase in quality, expand location services into new domains, and enable applications that are context and intent aware. In addition, services are provided that offer new capabilities and seamlessly merge different data sources in order to better serve users and provide better search results. Embodiments provide precise and valuable insights on the location of addresses, places, and points of interest (POIs). Embodiments minimize disruptions by incorporating external data into search results to extract more location insights. Embodiments allow for third party datasets or logic to enrich or tailor search experiences to meet specific needs. For example, users or entities may integrate custom or proprietary POI datasets into the search infrastructure in order to provide custom results.

In an example scenario, the Service Graph is looking for POIs for a search query. The Service Graph identifies, using an ontology, a context of the search and one or more data sources and one or more data services that may be useful. The Service Graph generates a search strategy and implements the strategy across the one or more data sources and one or more data services. However, one source is taking too long and so the Service Graph may also look for those POIs using a different service and the Service Graph learns that one service retrieves the results faster. So, in the future, the Service Graph prioritizes that one service to use for similar criteria and may be ignore the other service. This learning or intelligence for prioritization can be location based or take location criteria into consideration.

The result is higher quality search results and ranking. The Service Graph is designed to be a meta service on top of all other services. It lets you bring in different sources of data but gives you a unified result based on optimizing which service to use. It decides what service to prioritize on the fly. It can be time or cost driven—looking at processing time of different services. Also, it uses intelligence based on a machine learning/feedback loop, like looking at history of execution, to optimize/prioritize.

FIG. 1 illustrates an example system for executing location-based searches. The system includes one or more devices 122, a network 127, and a Mapping System 121. The Mapping System 121 may include a database 123 (also referred to as a Geographic Database 123 or map database) and a Service Graph 125. Additional, different, or fewer components may be included.

The one or more devices 122 may include probe devices, probe sensors, IoT (internet of things) devices, or other devices 122 such as personal navigation devices 122 or connected vehicles. The device 122 may be a mobile device or a tracking device that provides data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices may be configured as data sources that are configured to acquire roadway data. The devices 122 may be remotely monitored and controlled. The devices 122 may be part of an environment in which each device 122 communicates with other related devices in the environment to automate tasks. The devices may communicate sensor data to users, businesses, and, for example, the Mapping System 121.

In an embodiment, the device 122 is configured to generate or provide location-based queries, using for example, an application or user interface. A location-based query includes a topic and a reference location. The reference location may be based on a location of the device 122, for example using a positioning system, or may be included in the query, for example as in the query "restaurants in Chicago." Unlike a general web or internet search, a location-based search is expected to find and rank documents that are not only related to the query topic but also geographically related to the location which the query is associated with. In addition to the traditional text-based querying, location-based search engines often provide a more user-friendly query interface which uses graphical maps. One difference between general search engines and location-based search engines is that the first group search the web pages collected from the entire World Wide Web; while location-based search engines typically search on at least a smaller collection that may be referred to as the Geographic Database 123.

The Geographic Database 123 is configured to store and provide information to and from at least the Mapping System 121, Service Graph 125, and devices 122. The Geographic Database 123 may include one or more indexes of geographic data. The indexes may include various types of indexes that relate the different types of data to each other or that relate to other aspects of the data contained in the Geographic Database 123. The indexes may include, for example, data relating to points of interest or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The Geographic Database 123 provides data for a location-based search service. The Geographic Database 123 may be maintained by a content provider (e.g., a map developer). By way of example, the map developer may collect geographic data to generate and enhance the Geographic Database 123. The map developer may obtain data from sources, such as businesses, municipalities, or respective geographic authorities. In addition, the map developer may employ field personnel to travel throughout the geographic region to observe features and/or record information about the roadway.

To communicate with the systems or services, for example to and from the devices 122, the Service Graph 125 and Geographic Database 123 are connected to the network 127. The Service Graph 125 may receive or transmit data through the network 127. Mapping System 121 may also transmit paths, routes, or loss of traction risk data through the network 127. The Mapping System 121 may also be connected to an OEM cloud. Mapping and location-based services may be provided to vehicles via the OEM cloud or directly by the Mapping System 121. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information with other devices 122 or the Mapping System 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The Mapping System 121 includes at least one Service Graph 125. The Mapping System 121 may be a host for a website or web service such as a location-based search service, mapping service, and/or a navigation service. The mapping service may provide standard maps or high definition (HD) maps generated from the geographic data of the database 123, and the navigation service may generate routing or other directions from the geographic data of the database 123. The Service Graph 125 is also configured to provide a location-based search service that is implemented using a Service Graph 125. In an embodiment, the Service Graph 125 is configured to facilitate access to multiple services or data sources for a location-based query. The Service Graph 125 is configured to receive a query, identify which sources or services contain relevant data, generate an execution strategy for the query, execute the execution strategy, merge the results, and rank the results. The Service Graph 125 is configured using machine learning techniques that provide a learning framework for the Service Graph 125 to learn from feedback and internal metrics to better identify sources and services and provide more accurate and more helpful results.

The mapping service may also provide information generated from attribute data included in the database 123. The Mapping System 121 may also provide historical, future, recent or current traffic conditions for the links, segments, paths, or routes using historical, recent, or real time collected data. The Mapping System 121 is configured to communicate with the devices 122 through the network 127. The Mapping System 121 is configured to receive a request from a device 122 for a route or maneuver instructions and generate one or more potential routes or instructions using data stored in the Geographic Database 123. The Mapping System 121 may also be configured to provide up to date information and maps to external Geographic Databases or mapping applications. The Mapping System 121 may also be configured to generate routes or paths between two points (nodes) on a stored map. The Mapping System 121 may be configured to encode or decode map or geographic data. An HD map and the Geographic Database 123 may be maintained and updated by the Mapping System 121. The Mapping System 121 may include multiple servers, workstations, databases, and other machines connected together and maintained by a map developer. The Mapping System 121 may be configured to acquire and process data relating to roadway or vehicle conditions. For example, the Mapping System 121 may receive and input data such as vehicle data, user data, weather data, road condition data, road works data, traffic feeds, etc. The data may be historical, real-time, or predictive. The data may be stored in an HD map, in a location graph, or in the Geographic Database 123 for use in location-based services such as the location-based search service.

Figure 2:
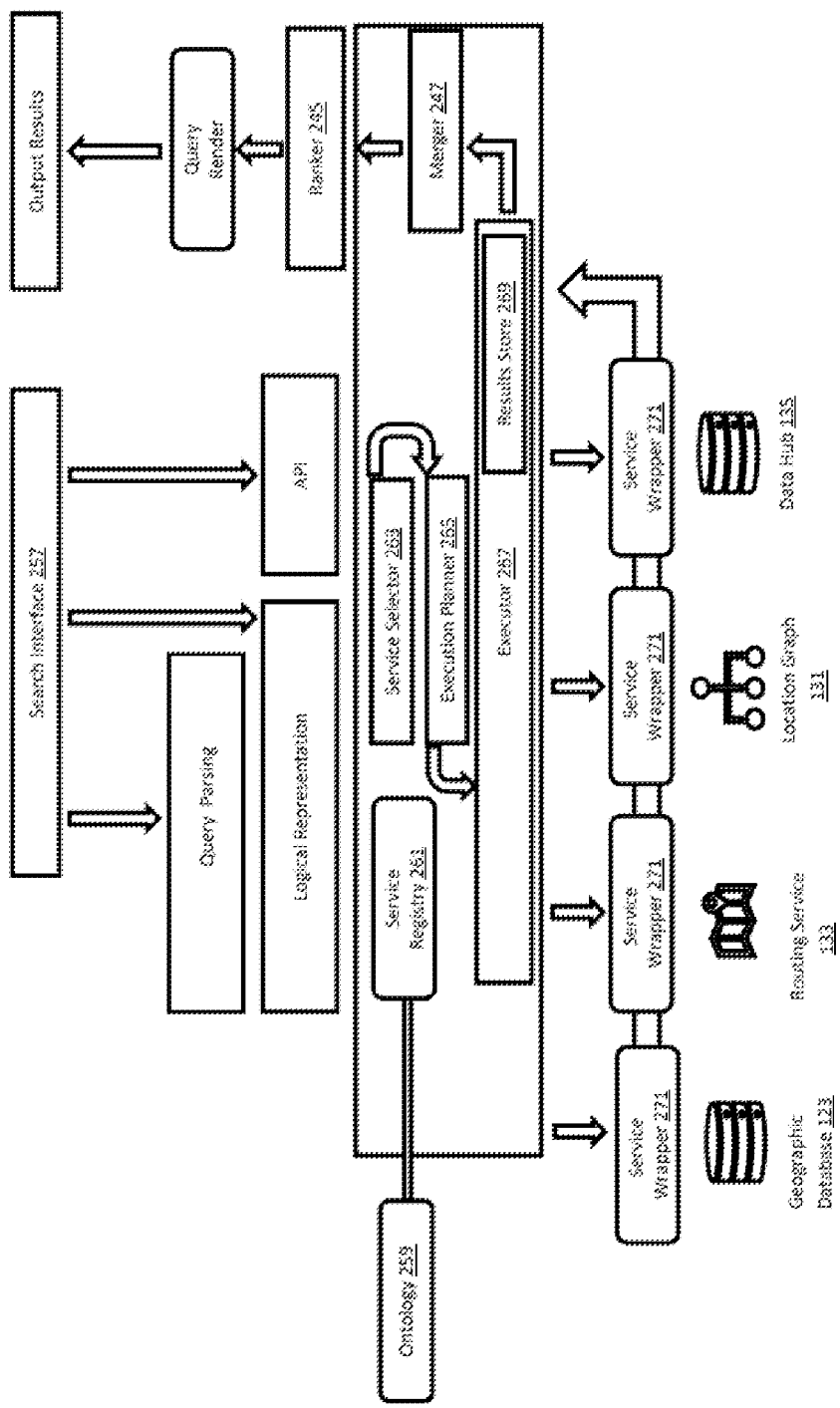
FIG. 2 depicts an example Service Graph of the system of FIG. 1 according to an embodiment.

FIG. 2 depicts an example Service Graph 125 that is configured for executing location-based searches across multiple services and data sources. FIG. 2 includes a Service Graph 125 that is in communication with the Search Interface 257, an Ontology 259, and Service Wrappers 271 that communicate or provide access to one or more data sources or data services, here depicted as the Geographic Database 123, a Location Graph 131, a Data Hub 135, and a Routing Service 133. The Service Graph 125 includes a Service Registry 261, a Service Selector 263, an Execution Planner 265, a Service Executor 267, a Ranker 245, a Merger 247, and a Storage 269 configured to store intermediate results. One or more components of the Service Graph 125 may be implemented as a separate component. Likewise, the service 125 may include additional, different, or fewer components. For example, a query parsing module, a logical representation module, an API, a query renderer, etc. may be included. The Service Graph 125 is configured to receive a location-based query, identify services or sources of relevant data, query the identified services or source, and merge, filter, and rank the results. The Service Graph 125 is further configured to learn using machine learning techniques which services or sources are the most relevant and contain useful data.

The Service Graph 125 is configured to receive a query from the Search Interface 257. The Search Interface 257 is configured to process and format queries into a format that is readable by the Service Graph 125. The Search Interface 257 uses a query translator to transform a free text query into an executable logical form that can be understood by the Service Graph 125. The Search Interface 257 may also be configured to receive queries in logical form or textual form directly from an application. In this scenario the query translator may be bypassed so that an application can directly run a query. The logical form is passed to the Service Graph 125 for execution, along with a context structure that includes a user's context such as current location, map bounds, current route, favorite places, favorite categories, among other contextual data. The logical form and context are provided by semantic query processing of the query and associated data. The goal of semantic query processing is to understand the context of the query and to extract the latent semantics. The extracted semantics are provided as a logical form that Service Graph 125 can understand. The query processing workflow includes several modules including query parsing, query type classifier, and representation with logical form. Other modules may be used such as query spell correction, tokenization, and query expansion. Generally, the most important semantic information of a query is the query type. The type of query implies what type of real-world location users want to find. Example location types may include a point of interest (POI), some regional type like area, a route or a direction to a certain location and a point on the map that is identified as an address or geocode. The query type is important in determining which service or source contains relevant data. In an example, if the query type includes a route, then the Routing Service 133 will be an important service that should be included in the searching process. If the query type includes a POI, then the Geographic Database 123 or Location Graph 131 may be important. Queries may include multiple types, for example, a route to a POI.

Parsing queries into a form that may then be used by Service Graph 125 requires logical representation to model the queries. In an embodiment, machine learning is used to identify types and context for each query using a location-based Ontology 259. The location-based Ontology 259 is configured to store information to understand how locations relate to one another. The applications of a location-based Ontology 259 include complex search/question answering. The location-based Ontology 259 may be used for any task that requires a nuanced semantic understanding of locations. In an embodiment, the location-based Ontology 259 maps POIs with a hierarchy of semantic categories. The location-based Ontology 259 is based on several data sources, including but limited to a place and category hierarchy, place and category links, external ontologies (Wikidata, schema.org, etc.), manual and heuristic annotation, among others. By using nodes as POIs and categories and relations as category/equivalence, the location-based Ontology 259 retains specific properties that are useful for downstream applications (e.g., nodes separated by short paths should be more semantically similar than nodes separated by long paths). New data and concepts may be added as customer and user needs change. In order to update and maintain the location-based Ontology 259, machine learning approaches for relation prediction may be used. Relation prediction refers to the task of determining whether (and how) two entities are related. Machine learning approaches for relation prediction may leverage nuanced entity representations to not only learn what an entity is but how it relates to the entitles around it, enabling the system to capture the underlying semantics that the location-based Ontology 259 represents. As an example, a system that understands the relationship between "Green Door Tavern" and "tavern" may seem trivial, but a good location-based Ontology 259 combined with machine learning approaches may be able to learn semantic relationships between any arbitrary pair of entities. For example, if the model knows that "Green Door Tavern" is a tavern and restaurant, it may also be able to predict whether it is "family friendly" without explicitly defining what that means.

The Service Registry 261 is configured to store meta-data that allows the Service Selector 263 to identify suitable services and sources to express a logical query. The Service Registry 261 may use manual registration of services when adding a new service or source. In an embodiment, the Service Registry 261 is configured to automatically discovery services or sources and attributes/uses for the services or sources. In an embodiment, the Service Selector 263 and Service Registry 261 are configured and trained using machine learning. Initially or when there is a lack of prior data, the Service Selector 263 may be configured to select or broadcast to all available connected sources. As results are received and the selection process is improved, the Service Selector 263 may learn to exclude or only include certain available services. New services may be identified and parsed to determine attributes or parameters. Training data (such as sample queries) may be used with the identified services and sources to generate results which may be quantified using feedback mechanisms. The feedback may be used to improve the selector and/or update/alter attributes or parameters in the Service Registry 261. Different neural network configurations and workflows may be used for any of the networks described herein such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of an image). The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

The neural network may be defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

In an embodiment, the network may be configured as an NLP deep learning network. NLP and machine learning techniques may be used to map unstructured text into a structured form as well as providing automatic identification and extraction of relevant information. NLP inputs text and extracts meaning associated with each word and sentence. NLP may use syntax and semantic techniques to identify the meaning. Syntax refers to the arrangement of words in a sentence such that they make grammatical sense. Semantics refers to the meaning that is conveyed by a text. A network may be trained to input text and output a structured form. In embodiment, the network(s) may be configured as a recurrent neural network (RNN). The RNN may be used to process sequential inputs like speech and language, element by element, with hidden units to store history of past elements. The RNN may be configured as a multilayer neural network with all layers sharing the same weights, when being unfolded in time of forward computation. The RNN may use long short-term memory networks (LSTM) and gated recurrent unit (GRU) to store and manipulate information. Gradient backpropagation or variants may be used for training the network(s).

Training of the network may include iteratively inputting labeled data and adjusting the network based on the results. Different metrics may be used to train the network, for example but not limited to access costs (CPU, I/O, network communication), past performance, and user feedback of result selection. In an embodiment, the network may be trained to identify which sources or services are relevant to particular locations. During operation, the Service Graph 125 may collect data which may be used to subsequently train and update the network(s). The network(s) may thus be improved over time and may be automatically configured for receiving new data sources or data services. In an example, when a new data sources is identified, the Service Registry 261 may request or derive attributes for the data source. Over time as the new data source is used as a source for different queries, the Service Graph 125 may learn which locations or types of queries the new data source is useful for. The Service Graph 125 may adjust the attributes in the Service Registry 261 as a result. The new data source is thus integrated into the Service Graph 125 without having to manually configure the Service Graph 125. In another example, a data source or service may only be useful for certain locations or types of locations. The Service Graph 125 may identify based on feedback where these locations are and may only access the data source or service when a query includes a reference to these locations.

The Service Selector 263 is configured to use the metadata from the Service Registry 261 to identify services with data relevant to a query. The Service Selector 263 uses the logical form to construct a service tree containing a hierarchy of the appropriate services selected to execute the query. More than one service may be selected for each of the nodes in the graph. Certain sources may depend on the result of other sources. For example, a query may request a route to a type of POI. The Routing Service 133 may be called first to identify possible location references which then may be used by the Location Graph 131 to identify candidate POIs. The service tree may include different options that include different sets of sources or services. In the example above, two different options may be Routing Service 133→Location Graph 131 or Routing Service 133→Geographic Database 123. With hundreds or thousands of possible data sources and services there may be multiple different paths or choices. The Execution Planner 265, described below, may identify which branch of the tree to pursue (or multiple branches) based on access costs and feedback. Multiple services or sources may be returned and processed either by merging and deduplication, ranking, or simply selects results from whatever service returns first. This is handled by the Execution Planner 265 and Service Executor 267 described below. The dynamic nature of service selection means that the Service Selector 263 is likely to select different services for different queries. As with the Service Registry 261, the Service Selector 263 may be trained or configured using machine learning, the Ontology 259, feedback from searches, and/or labeled training search data.

The Execution Planner 265 is configured to build a plan for orchestrating the order of calls representing one of more possible execution strategies. The Execution Planner 265 creates one or more execution strategies out of the collection of services returned by the Service Selector 263. The criteria used for the procedure may include access costs (CPU, I/O, network communication), past performance, and user feedback of result selection. This criteria and information may be stored by a data logger that is configured to log parameters for the implemented execution strategy. In an example, the Service Graph 125 is looking for POIs and it uses Location Graph 131 for that service, but that is taking too long and so the Service Graph 125 may also look for those POIs using a different service and the Execution Planner 265 learns that one service retrieves the results faster. So, in the future, the Execution Planner 265 will prioritize that one service to use for similar criteria and possibly ignore the other service. The results and metrics of requests may be stored in the Service Registry 261 for use in later searches. The learning or intelligence for prioritization may be location based or take location criteria into consideration. The Execution Planner 265 also determines how the service responses will be used, e.g., what call is a spatial or temporal filter, and restructures a call tree to reduce the size and cardinality of the intermediate responses. In an embodiment, multiple execution strategy may be provided for each query.

The Service Executor 267 is configured to implement the selected Service Wrappers 271 and sequences the calls based on the execution plan. As service calls return responses, The Service Executor 267 manages the intermediate results cache, handles errors, and terminates long-running calls. Once lower service dependencies calls are returned, the results are stored into an intermediate results cache and used by the higher calls to filter and combine. Once the execution plan is complete, the filtered and combined results are sent to be merged.

The Service Wrapper 271 is configured to act as an interface to the various services and data sources used by the Service Graph 125. The Service Wrapper 271 handles the translation of service parameters (like place category) to the matching schema for that particular service, using anything from a hash table to an ML-based resolver. It also abstracts the service connection protocol and the results format. The Service Wrapper 271 normalizes the results using the Ontology 259 or a custom dictionary. The Service Wrapper 271 may also act as a façade allowing a developer to build Service Wrapper 271 out of numerous other services.

FIG. 2 depicts three different data sources/services. The Service Graph 125 may be configured to interact with hundreds or thousands of different sources or services. As depicted the data sources include the Geographic Database 123, the Location Graph 131, and the Data Hub 135. The data services include a Routing Service 133.

The Geographic Database 123 may include one or more indexes of geographic data. The indexes may include various types of indexes that relate the different types of data to each other or that relate to other aspects of the data contained in the Geographic Database 123. The indexes may include, for example, data relating to points of interest or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc.

The Location Graph 131 is a graph that includes relationships between location objects in a variety of ways. Objects and their relationships may be described using a set of labels. Objects may be referred to as "nodes" of the Location Graph 131, where the nodes and relationships among nodes may have data attributes. The organization of the Location Graph 131 may be defined by a data scheme that defines the structure of the data. The organization of the nodes and relationships may be stored in an Ontology 259 which defines a set of concepts where the focus is on the meaning and shared understanding. These descriptions permit mapping of concepts from one domain to another. The Ontology 259 is modeled in a formal knowledge representation language which supports inferencing and is readily available from both open-source and proprietary tools.

The Data Hub 135 is a real-time cloud-based location hub for discovering, storing, retrieving, manipulating, and publishing private or public mapping data. The Data Hub 135 is configured to make map data access simple and efficient for users and organizations by providing a method for ingestion. The Data Hub 135 allows users to upload gigabytes of data in different formats, store, organize and retrieve the data in near real-time for greater control and convenience. The Data Hub 135 may include multiple different sets of data, some private and some public. One or more data sources may be nested or embedded in other sets of data. When selected, a tree may be provided that indicates the location or application that are to be called to access the data.

The Routing Service 133 is configured to calculate routes between location. A Service Wrapper 271 may interact with the Routing Service 133 using a routing API. The Routing Service 133 may be configured to calculate a route for a set of waypoints, update a previously calculated route, calculate an area that can be reached by travelling a given distance or time, calculate an area that can be reached by travelling a given distance, time or by using a given amount of fuel/energy, and/or calculate a matrix of routes between many start points and destinations. For a location-based search, a user may query POIs within a certain travel time. The Routing Service 133 may be used to calculate the distance or possible routes. This data may be used by other services or data sources to improve or filter results.

Additional data sources or services may be used. For example, external or proprietary databases may be provided by organizations or users. Public sources of data may also be used. Services such as other search engines or location-based services may also be used. Each service or source may include its own Service Wrapper 271 that interfaces between the Service Graph 125 and the service/source. As described above, each service/source may also include parameters or attributes stored in the Service Registry 261 that assist the Service Selector 263 in identifying which service/source includes data relevant to a query. As described above, the Service Registry 261 and Service Selector 263 may be taught which services/sources are useful for particular searches (either based on type or other semantic data derived from the query). In an example, a new source may be added to the Service Graph 125. The Service Selector 263 may attempt to use the new source for different queries (either actual or test/training queries). The Service Graph 125 logs the results using feedback from the Search Interface 257/user. The Service Graph 125 also logs the technical details, for example, how long it took to get results, overlap with other services, bandwidth requirements, etc. This data is accumulated over time and used by the Service Selector 263 to identify when and when not to use the new service.

The results from each of the services/sources are stored into an intermediate results storage 269. The merger 247 retrieves the partial results for a given query from the Intermediate Results Storage 269 and merges the results. The results are passed to the ranker 245 that is configured to rank the results. Different ranking mechanisms may be used. In an example, each POI that is returned includes at least one feature (e.g. a 'relevance_factor') that is used by the ranker to give precedence to POIs with higher values and a second feature (distance) that is the distance from a location reference derived from the search query. Given a search query, if 2 POIs are returned: A (distance=3.14, relevance_factor=1) and B (distance=3.14, relevance_factor=2), then B is ranked first and A is ranked second because all their features except the relevance_factor are the same. If the 2 returned POIs are: A (distance=0.5, relevance_factor=1) and B (distance=3.14, relevance_factor=1), then A is ranked first, because it is closer to the user location and has the same relevance_factor as B. If the 2 returned POIs are: A (distance=0.5, relevance_factor=1) and B (distance=3.14, relevance_factor=2), then, there is not a clear determination. The ranker 245 may learn, using machine learning to identify which POI should be ranked first. Results may be provided to a user or application that provides feedback to the Service Graph 125. Multiple different features may be used by the ranker in addition to or as an alternative for relevance_factor. The relevance_factor feature data may be useful as it provides (for user created datasets) users or organizations an ability to assign the value they want based on their business logic or need. For example, a food delivery service might assign higher relevance value to restaurants with little waiting time and lower relevance value to the ones with bad customer ratings.

The ranked results may be augmented with additional data and then presented to a user or application. As described above, each of the components may be improved over time by collecting feedback and other metrics as searches are run and results are generated. The components may use machine learning techniques to learn to generate more accurate and more efficient search results. Training of the components may be supervised or unsupervised. Supervised training learns a function that maps an input to an output based on example input-output pairs. Supervised training infers the function from labeled training data consisting of a set of training examples. Example search queries and ideal results may be used to train the Service Graph 125 to identify sources, filter the results, and rank the results. Unsupervised learning uses data that has not been labelled, classified, or categorized. Instead of responding to feedback, analysis identifies commonalities in the data and reacts based on the presence or absence of such commonalities in each new piece of data. This approach helps detect anomalous data points that do not fit into either group.

Figure 3:
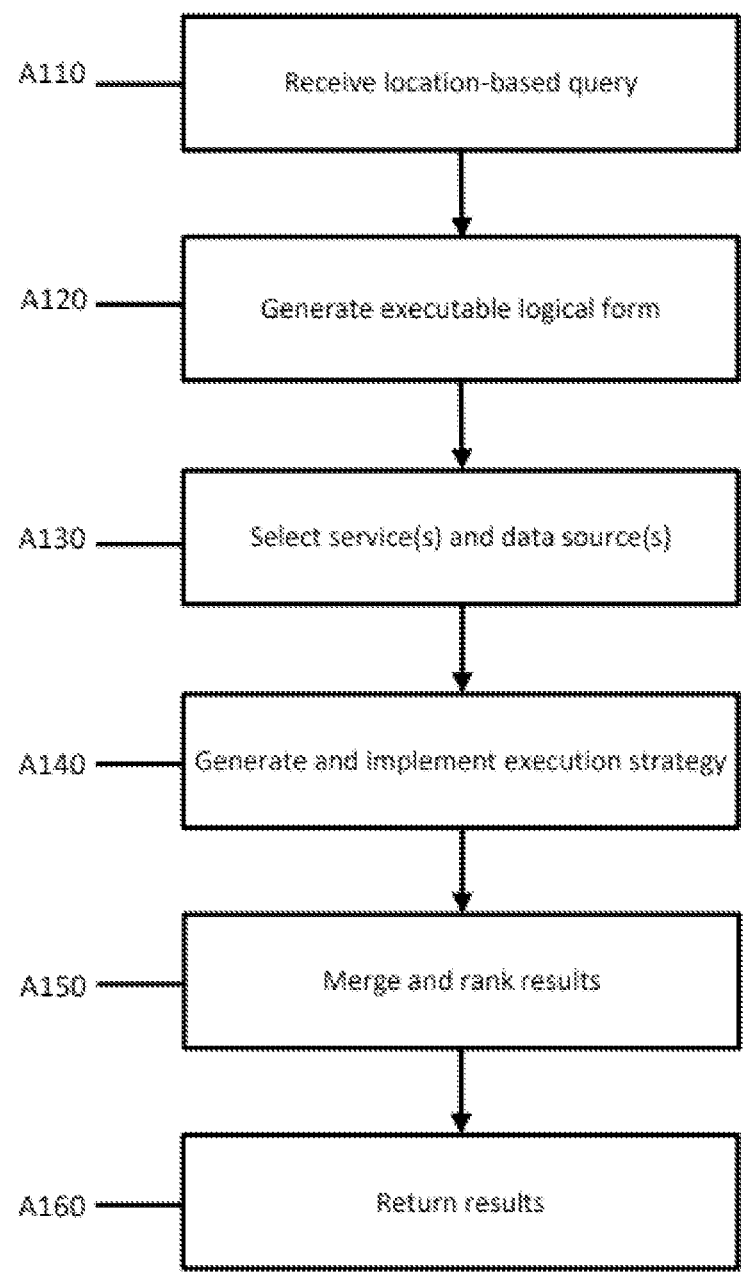
FIG. 3 depicts an example workflow for location-based searching across multiple heterogenous data sources and services according to an embodiment.

FIG. 3 depicts an example workflow for location-based searching across heterogeneous data sources and location services using the system of FIG. 2. As presented in the following sections, the acts may be performed using any combination of the components indicated in FIG. 1 or FIG. 2. The following acts may be performed by the Service Graph 125, the device 122, the Mapping System 121, or a combination thereof. Additional, different, or fewer acts may be provided. The acts are performed in the order shown or other orders. The acts may also be repeated. Certain acts may be skipped.

At act A110, the Service Graph 125 receives a location-based query, for example, through the Search Interface 257. The location-based query may include a location reference and one or more subjects. An example location-based query may be "restaurants in Chicago" where Chicago is the location reference and restaurants is the subject. The location reference may be explicit and included in the query, or implicit, for example based off a location of a device 122 that is providing the location-based query. A typical location-based query may request information about point of interests that are near or close to a location. A point of interest (POI) may include any object or reference that also has a location. For example, a hotel, a gas station, a store, a park, a monument, etc. A POI may also include waypoints or other location-based points. Feature data for the POIs may be stored in a Geographic Database 123 along with a location, for example, the latitude and longitude of each POI. In an embodiment, the location-based query is received from a mobile device 122.

The Service Graph 125 may include a general processor, digital signal processor, an application specific integrated circuit (ASIC), field programmable gate array (FPGA), analog circuit, digital circuit, combinations thereof, or other now known or later developed processor. The Service Graph 125 may be a single device or combinations of devices, such as associated with a network, distributed processing, or cloud computing. The Service Graph 125 is configured to receive the query or search request from the search interface 257 and provide search results. The Service Graph 125 may be configured with query analysis (country detection, sequence labelling (i.e. tagging)), a spelling component (spell correction, misspell term generation), an expander (name variant generation, a normalization module, tokenization), an aligner (scoring & alignment) a ranker (ranking, merging, and cutting), a renderer (language variant selection, address label creation), among other functions and applications.

At act A120, the Service Graph 125 generates an executable logical form from the location-based query. The location-based query may be received in a logical form or textual form, for example provided by an application that is configured to operate with the Service Graph 125. Alternatively, the location-based query may need to be converted or formatted into a form that is understandable by the Service Graph 125. In certain scenarios, a simple conversion may be used where the search terms are well known of common. In an embodiment, to generate the executable logical form, the Service Graph 125 may use a machine-learned semantic dependency parser that uses rules and relationships defined by an Ontology 259. The Ontology 259 defines the semantic relation between things, places, and locations. Different regions and location may use different ontologies. The Ontology 259 is used by the Service Registry 261 and wrappers to describe what semantics a service supports. The goal of semantic query processing is to understand the context of the raw query, for example as provided using natural language, and to extract the latent semantics within a query. Furthermore, the extracted semantics will be represented as a logical form that Service Graph 125 can execute. The query processing workflow consists of several modules to achieve this goal. The modules in query processing may include, for example, query parsing, query type classifier, and representation with logical form. The query spell correction, tokenization, and query expansion may also be included. One of the most important semantic information of a query is the query type. The type of query implies what type of real-world location users want to find. The location type can be a point of interest (POI), some regional type like area, a route or a direction to a certain location and a point on the map that is identified as an address or geocode. The query type classifier may be implemented using a Convolutional Neural Network (CNN) or a Recurrent Neural Network (RNN). The output of the query processing is an executable logical form that can be understand by other components of the Service Graph 125. This translation from natural language to the logical form may be improved over time or altered as the Ontology 259 is updated or different formats, categories, or labels are used.

Figure 4:
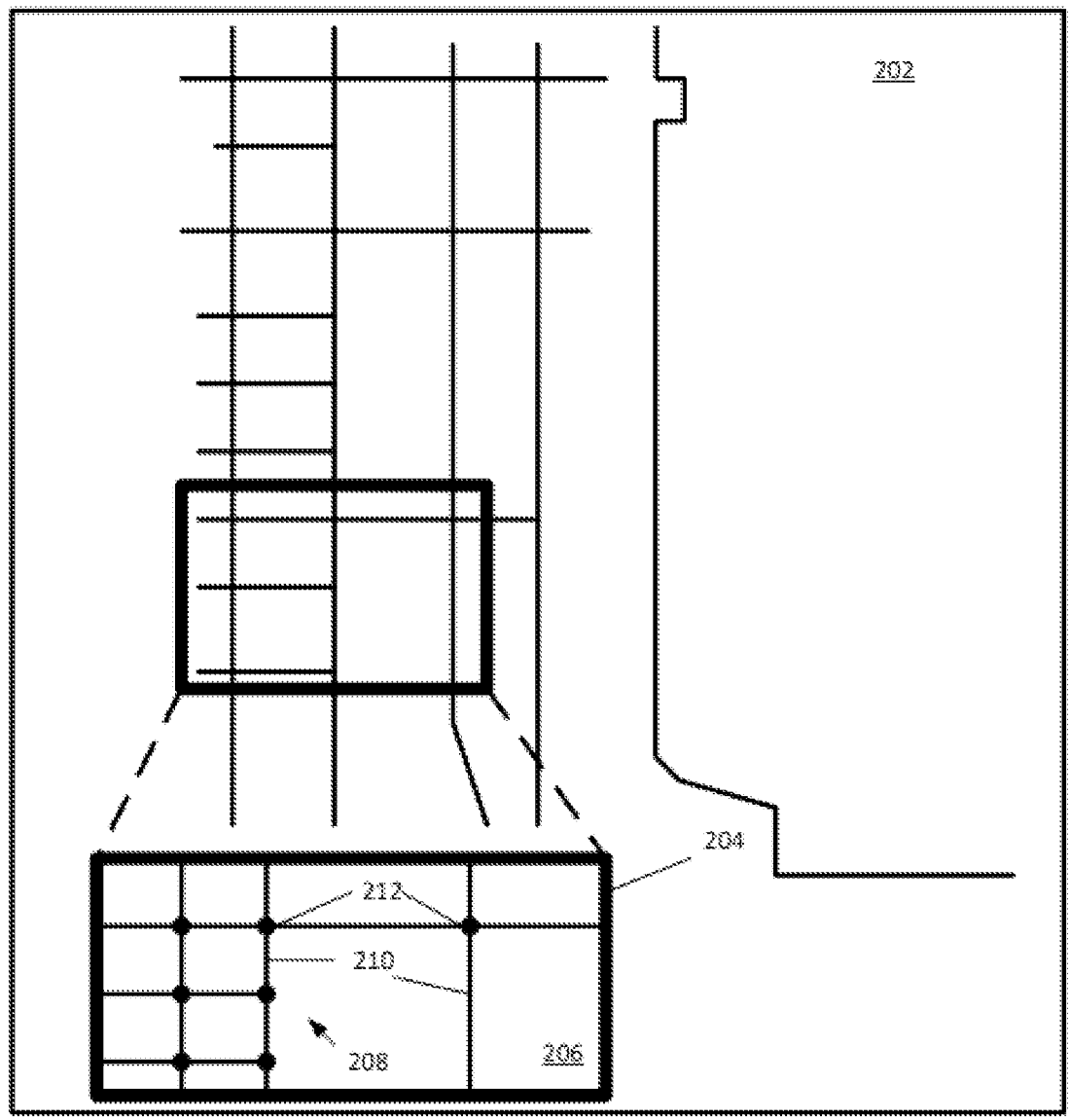
FIG. 4 depicts an example map of a geographic region.

At act A130, the Service Graph 125 identifies and selects based on the executable logical form/textual form and data stored in the Service Registry 261, at least one location service from a plurality of heterogeneous location services or at least one data source from a plurality of heterogeneous data sources that contain data relevant to the location-based query. The at least one location service or at least one data source may be selected based on a location reference included in the executable logical form. The Service Registry 261 contains meta-data that allows the Service Graph 125 to identify suitable APIs and data sources for a logical query. The meta-data is used to identify services with data relevant to a query. The Service Graph 125 uses the logical form to construct a hierarchy of the appropriate services selected to execute the query. More than one service can be selected for each of the nodes in the graph. As an example, the Service Graph 125 may identify different services or sources that may be useful that are dependent on one another. For example, the Service Graph 125 may identify a search engine and a particular database that the search engine may be able to search as a potential service. Certain data sources may include multiple different databases that may individually include relevant data for the search query. How multiple results are returned can be handled in several ways, either by merging and deduplication, ranking, or simply selects results from whatever service returns first. The types of services may be varied and include any data source or service that is configured to provide data to the Service Graph 125 or from which the Service Graph 125 can acquire data. Example data sources may include the Geographic Database 123, a location graph 131, or the data hub 135. Example data services may include a Routing Service 133 or another search engine. One data source that is typically accessed for location bases searches is the Geographic Database 123 which stores location-based data collected and maintained by a map developer. The Geographic Database 123 includes information about one or more geographic regions. FIG. 4 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 4 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 5:
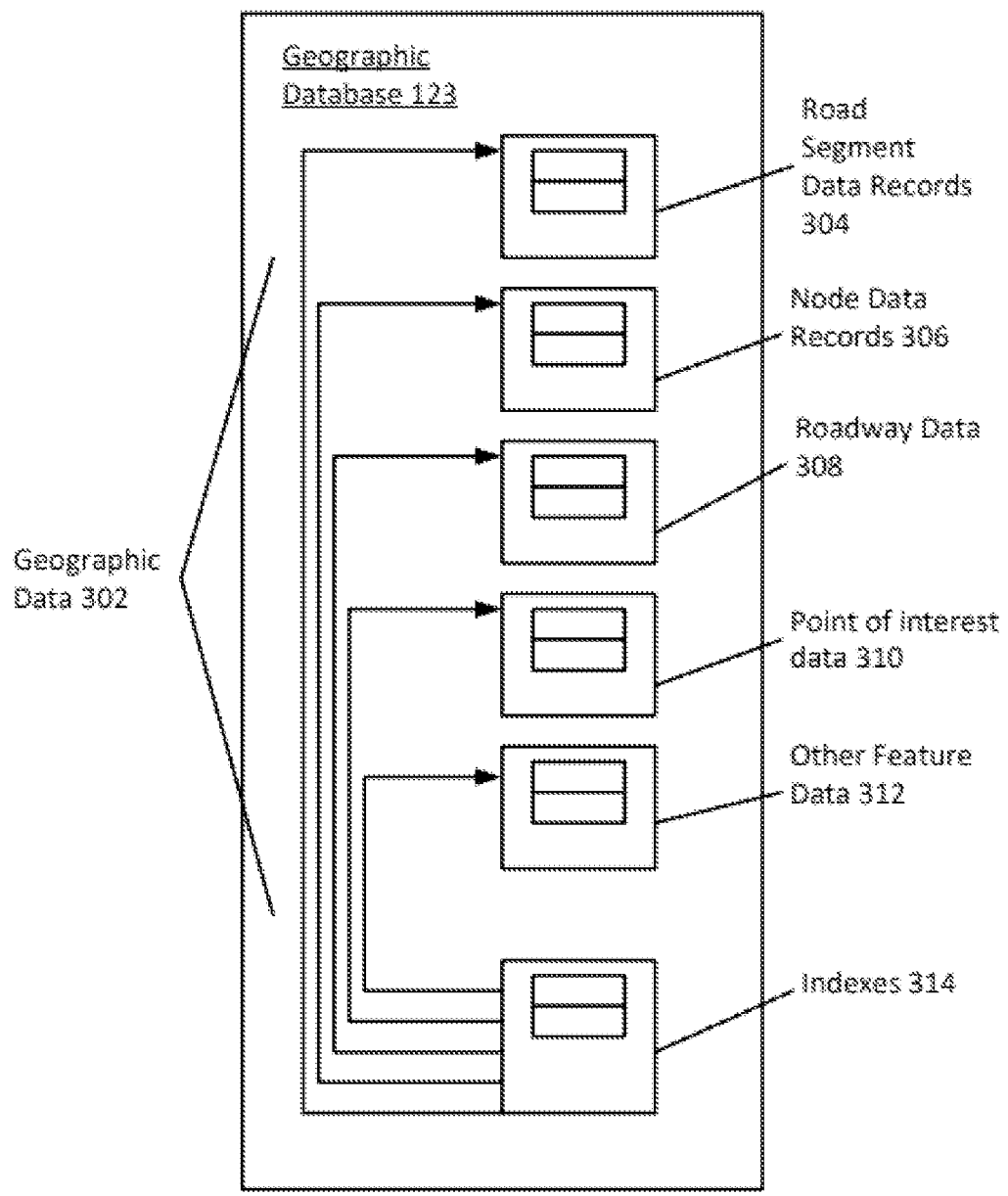
FIG. 5 depicts an example Geographic Database of the system of FIG. 1.

As depicted in FIG. 5, in one embodiment, the Geographic Database 123 contains geographic data 302 that represents some of the geographic features in the geographic region 202 depicted in FIG. 4. The data 302 contained in the Geographic Database 123 may include data that represent the road network 208. In FIG. 5, the Geographic Database 123 that represents the geographic region 202 may contain at least one road segment database record 304 (also referred to as "entity" or "entry") for each road segment 210 in the geographic region 202. The Geographic Database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The Geographic Database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges etc. The roadway data 308 may be further stored in sub-indices that account for different types of roads or features. The point of interest data 310 may include data or sub-indices or layers for different types points of interest. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data 312 may include other roadway features.

The Geographic Database 123 also includes indexes 314. The indexes 314 may include various types of indexes that relate the different types of data to each other or that relate to other aspects of the data contained in the Geographic Database 123. For example, the indexes 314 may relate the nodes in the node data records 306 with the end points of a road segment in the road segment data records 304.

Figure 6:
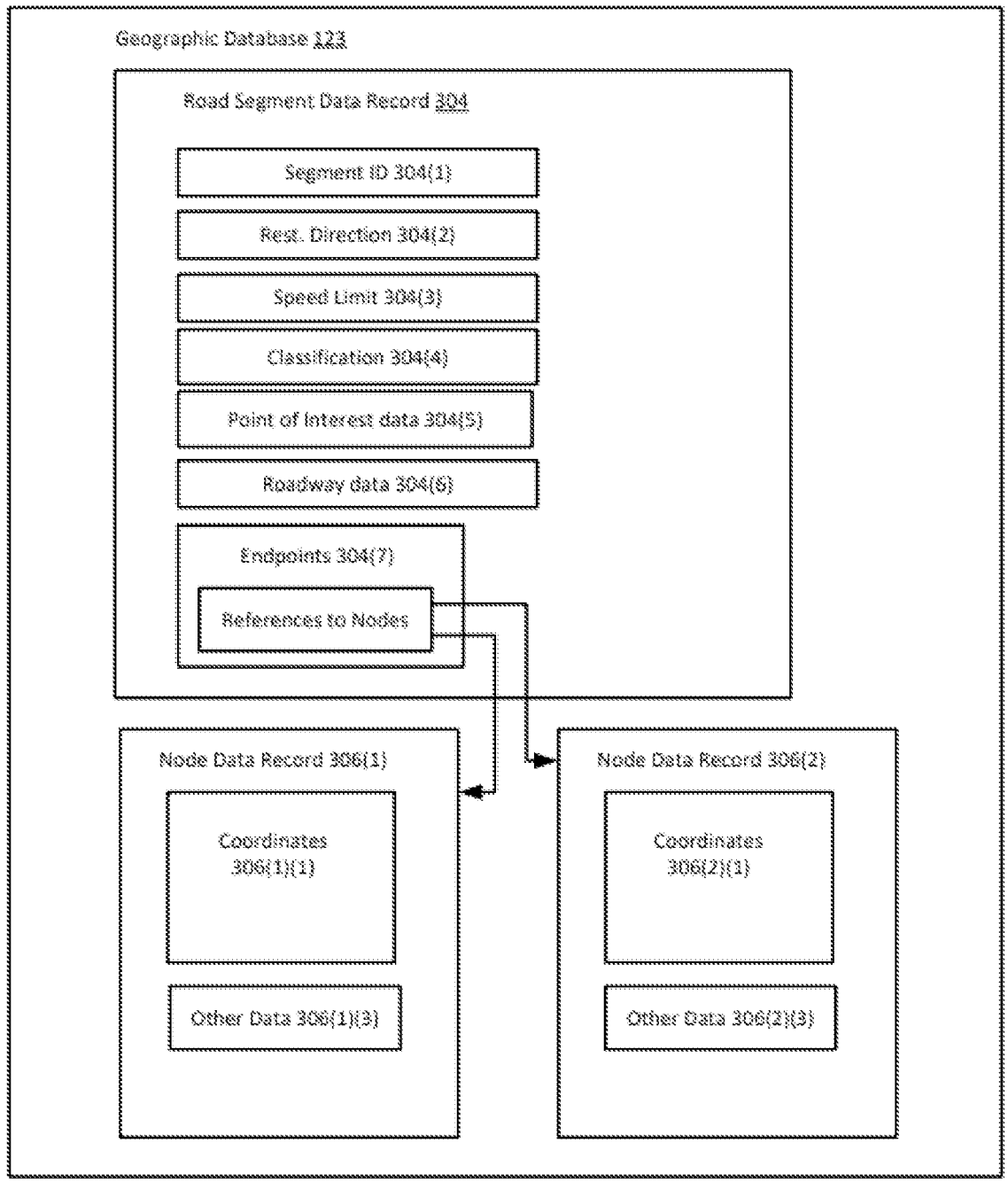
FIG. 6 depicts an example structure of segments and nodes in the Geographic Database.

FIG. 6 shows some of the components of a road segment data record 304 contained in the Geographic Database 123 according to one embodiment. The road segment data record 304 may include a segment ID 304(1) by which the data record can be identified in the Geographic Database 123. Each road segment data record 304 may have associated with the data record, information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes roadway data. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 6 also shows some of the components of a node data record 306 which may be contained in the Geographic Database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 6, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in in the Geographic Database 123 may also be organized using a graph that specifies relationships between entities. A Location Graph 131 is a graph that includes relationships between location objects in a variety of ways. Objects and their relationships may be described using a set of labels. Objects may be referred to as "nodes" of the Location Graph 131, where the nodes and relationships among nodes may have data attributes. The organization of the Location Graph 131 may be defined by a data scheme that defines the structure of the data. The organization of the nodes and relationships may be stored in an Ontology 259 which defines a set of concepts where the focus is on the meaning and shared understanding. These descriptions permit mapping of concepts from one domain to another. The Ontology 259 is modeled in a formal knowledge representation language which supports inferencing and is readily available from both open-source and proprietary tools.

Figure 7:
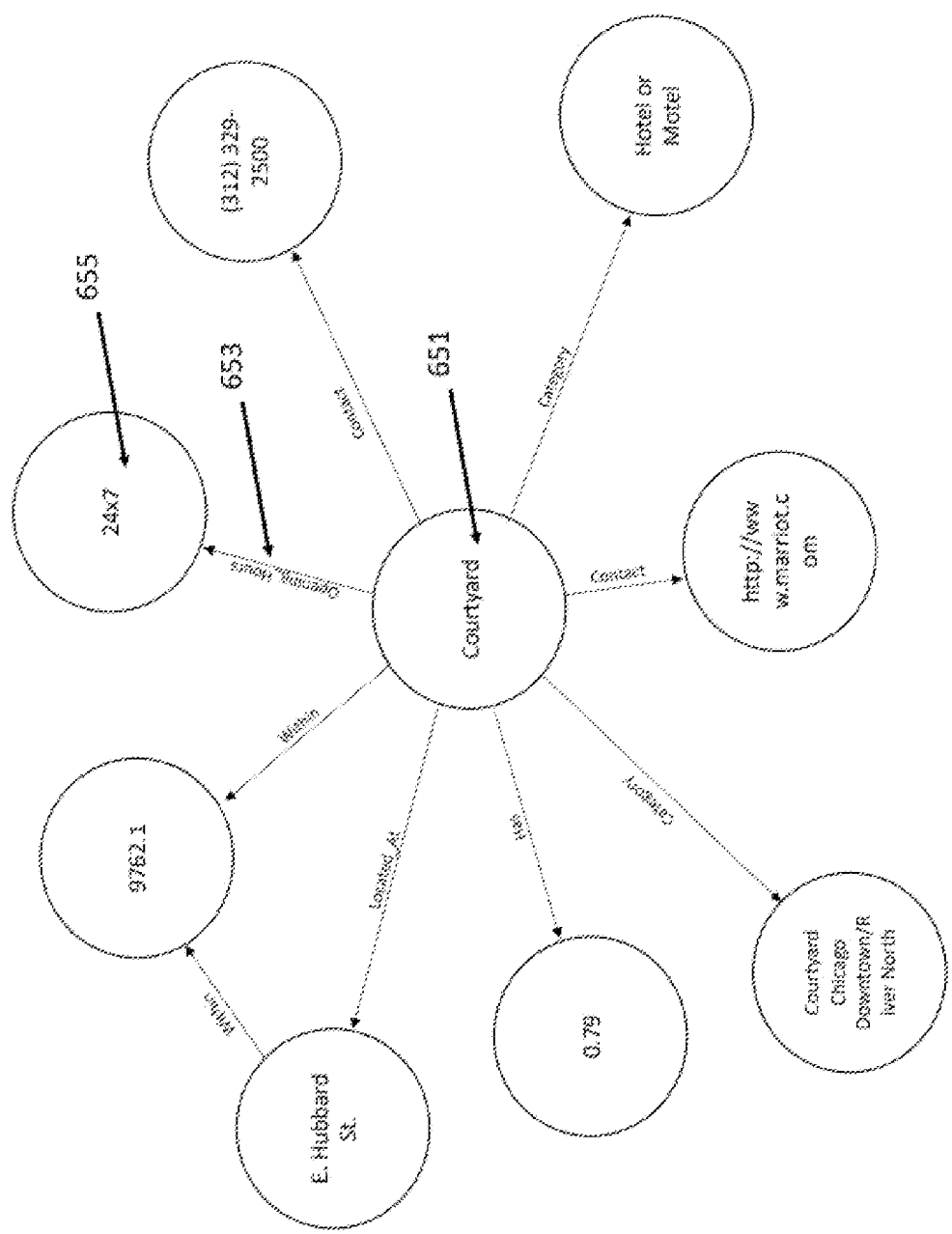
FIG. 7 depicts an example location graph according to an embodiment.

FIG. 7 depicts an example portion of a Location Graph 131 for the courtyard Chicago downtown hotel. As depicted, the entry for courtyard 651 is related to other nodes by relationships such as the relationship opening_hours 653 and the node 24×7 655. The Location Graph 131 may be used to assist in providing search results and matching or linking entities between the Geographic Database 123 and the secondary or user provided dataset. The Mapping System 121 may also identify a context for which the Location Graph 131 is used, and therefore provide appropriate natural guidance accordingly. The natural language guidance may be created by combining a Location Graph 131 and an Ontology 259. This may be performed, in part, through Natural Language Generation (NLG) algorithms that can produce natural instructions from a digital representation of data. These algorithms may translate graph-based representations into natural languages. Additionally, or alternatively, templates may be used that generate different styles of natural language instructions depending on the use case, context, or problem domain.

A Location Graph 131 combined with a graph-based natural language generation system may provide location-based search results dynamically and may be dependent upon external factors including context such as time of day, the search requesting entity, or location reference, among others. Additional information may be added to the Location Graph 131 by users to further enhance the detail and information level provided by the natural guidance. For example, a service technician may visit a building for the first time and may identify where a circuit breaker panel is within the building. This location may be added to the location map as a new location node or bound to an existing location node if that location node corresponds to the location of the circuit breaker panel. In this manner, a subsequent service visit, whether or not it is from the same service technician, may be guided to the circuit breaker panel through natural guidance efficiently and effectively. The Location Graph 131 described herein may include relationships of various kinds between nodes of the location maps and may use different relationships based on a context of the user. Thus, the Location Graph 131 is a series of interconnected nodes that are traversed according to the context of a user.

Referring back to FIG. 3, at act A140, the Service Graph 125 generates and implements an execution strategy for searching the at least one location service and the at least one data source. The Service Graph 125 generates a plan for orchestrating the order of calls representing one of more possible execution strategies. The Service Graph 125 creates an optimal execution strategy out of the collection of services identified at act A130. As an example, the collection of services may include duplicates or multiple different sources for similar information. Different sources or services may require complex calls or access. Different sources or services may be dependent on one another. Certain sources or services may need to be accessed first to supply information or data for subsequent sources or services. The criteria used for the procedure may include access costs (CPU, I/O, network communication), past performance, and user feedback of result selection among other metrics. The criteria may be recorded and stored by a data logger configured to log parameters for each implemented execution strategy. The plan also determines how the service responses will be used, e.g., what call is a spatial or temporal filter, and restructure the call tree to reduce the size and cardinality of the intermediate responses. The Service Graph 125 instantiates the selected Service Wrappers 271 and sequences the calls based on the execution plan. The Service Wrappers 271 act as a standard interface to the various services and data sources used by the Service Graph 125. The Service Wrappers 271 handle the translation of service parameters (like place category) to the matching schema for that particular service, using anything from a hash table to an ML-based resolver. The Service Wrappers 271 also abstract the service connection protocol and the results format. The Service Wrappers 271 also normalize the results using the Ontology 259 or custom dictionary. As service calls return responses, the Service Graph 125 manages the intermediate results cache, handles errors, and terminates long-running calls. Once lower service dependencies calls are returned, the results are stored into intermediate results cache and used by the higher calls to filter and combine. Once the execution plan is complete, the filtered and combined results may be merged and/or ranked.

In an embodiment, the Service Graph 125 merges and ranks results received as a result of the execution strategy. A unique identifier that is shared by the data sources and services may be used to merge the sets of results. If there is no overlap, two candidates included in the results may be simply joined. If there is overlap, for example, one or the other candidate may be given priority and is used. After being merged, the results are ranked. The ranker ranks the results using, for example, a distance to a reference location in the query and the relevancy of the results to the context or semantic intent of the query.

At act A150, the Service Graph 125 provides the results. Additional information may include, for example, a rendered map, images, ratings, etc. This additional information may be stored in the Geographic Database 123 or in another datastore. This additional information is generally cosmetic or visual and does not factor into the search but rather provides a more detailed user interface for the search and search results. The Service Graph 125 may provide the results to one or more devices 122 or one or more applications.

As an example, a banking organization may provide a search interface to provide customers with an application that can show closest ATM belonging to the bank consortium. The banking organization can provide customers an application to search and navigate to ATMs and those of the banks with which the bank is partnered. This may require searching across multiple and heterogeneous data sources and services. In another example, an automotive OEM may enable electric vehicles to adapt their routes and integrate an optimal recharging pause. The OEM can provide an in-vehicle-infotainment system that is configured to provide a search interface specifically tailored for the purpose of the OEM, hosting both the EV Charging Stations the OEM supports and those from a third-party supplier that the OEM licenses data. This may require searching across multiple and heterogeneous data sources and services.

In another example, the results may be provided to a mobile device 122. A user of mobile device may request information about types of locations that are close to the mobile device 122. The Service Graph 125 may identify relevant sources or services based on the location of the mobile device 122. The result is quicker, more accurate, and higher quality results.

Figure 8:
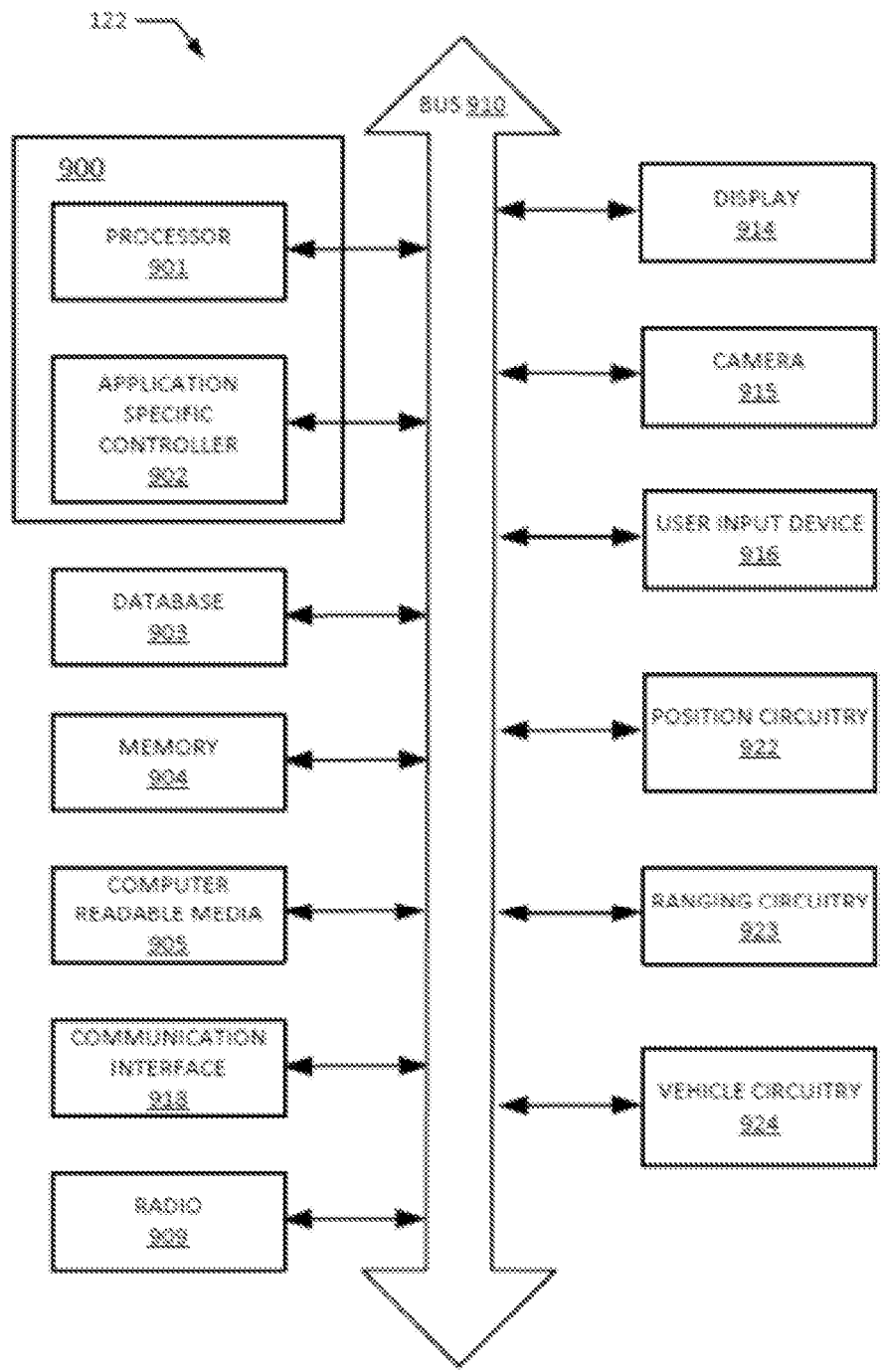
FIG. 8 depicts an example device of the system of FIG. 1.

FIG. 8 illustrates an example mobile device 122 for the system of FIG. 1 that may request a location-based search from the Mapping System 121. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the Geographic Database 123. The device-side database 903 may be a user database that receives data in portions from the database 903 of the mobile device 122. The communication interface 918 connected to the internet and/or other networks (e.g., network 127 shown in FIG. 1). The vehicle circuitry 924 may include any of the circuitry and/or devices described with respect to FIG. 9. Additional, different, or fewer components may be included.

The controller 900 may communicate with a vehicle engine control unit (ECU) that operates one or more driving mechanisms (e.g., accelerator, brakes, steering device). Alternatively, the mobile device 122 may be the vehicle ECU, that operates the one or more driving mechanisms directly.

The controller 900 may include a routing module including an application specific module or processor that calculates routing between an origin and destination. The routing module is an example means for generating a route. The routing command may be a driving instruction (e.g., turn left, go straight), that may be presented to a driver or passenger, or sent to an assisted driving system. The display 914 is an example means for displaying the routing command. The mobile device 122 may generate a routing instruction based on the anonymized data.

The routing instructions may be provided by the display 914. The mobile device 122 may be configured to execute routing algorithms to determine an optimum route to travel along a road network from an origin location to a destination location in a geographic region. Using input(s) including map matching values from the Mapping System 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

A user interface may include the input device 916 and an output device 914. The user interface may be configured to generate a query and provide results to a user. The results may be providing using data from a primary database, for example, the Geographic Database 123, and a secondary database that contains at least POI record that is not contained in the Geographic Database 123. The user interface provides a location-based query. The Mapping System 121 queries one or more data sources and/or location services for one or more candidates for the location-based inquiry. The Service Graph 125 or Mapping System 121 identifies the one or more data sources and one or more services using a machine trained Service Selector 263. The candidates are merged, filtered, and ranked. Ranking may be based on relevancy of the candidates to the location-based inquiry. The ranked candidates are provided to the device 122. The output device 914 may provide a rendered view of the ranked one or more candidates to a user. The results may be used by an application in the device 122 to route or control one or more features in a vehicle or the device 122.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

Figure 9:
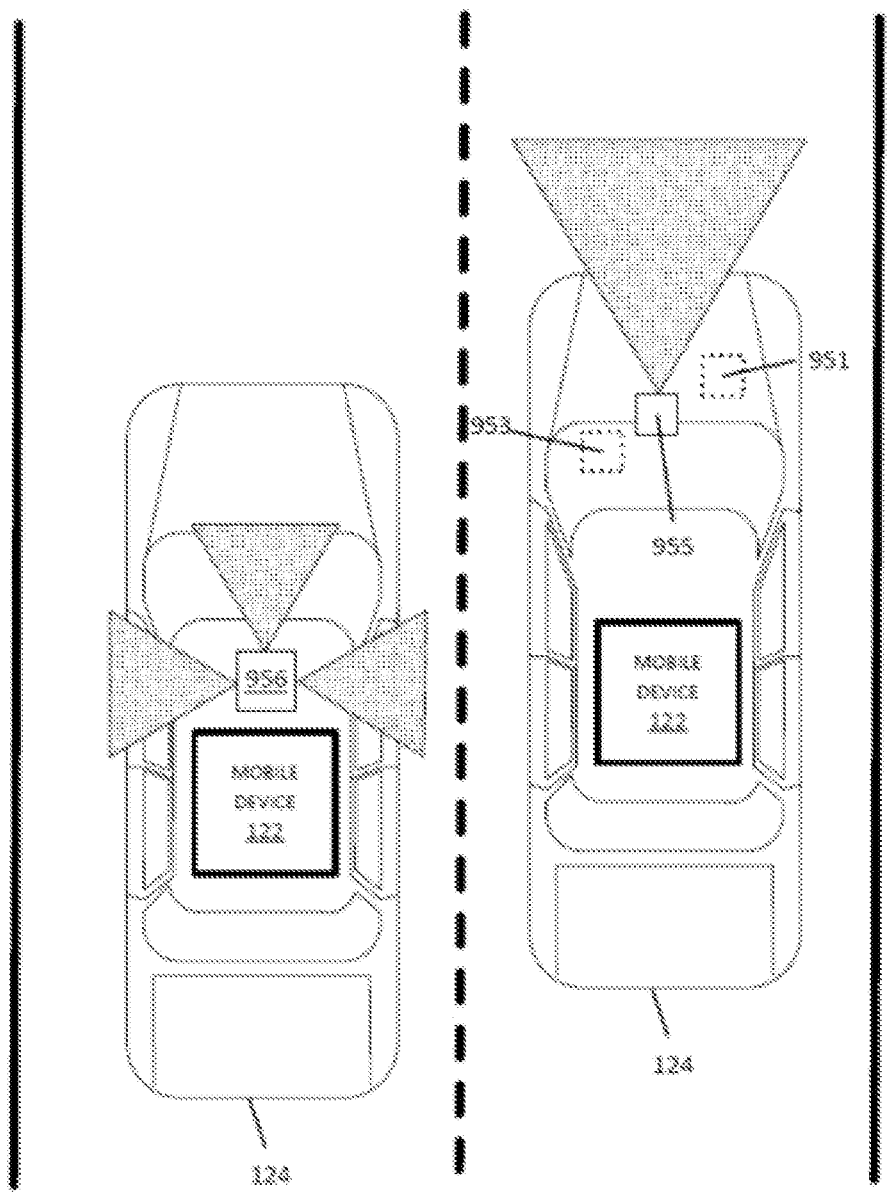
FIG. 9 depicts an example vehicle for the device of FIG. 8 according to an embodiment.

FIG. 9 illustrates exemplary vehicles 124 for providing location-based services or application using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the Mapping System 121. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and the Mapping System 121. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from Geographic Database 123 and the Mapping System 121 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from Geographic Database 123 and the Mapping System 121 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from Geographic Database 123 and the Mapping System 121 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from Geographic Database 123 and the Mapping System 121 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for location-based searching across plurality of heterogeneous data sources and location services, the method comprising:
   receiving, by a computer processor, a location-based query;
   storing meta-data for the plurality of heterogeneous data sources and location services;
   generating, by the processor using a location-based ontology, an executable logical form for the location-based query, wherein the generating comprises processing and transforming the location-based query into the executable logical form via a pipeline of a machine-learned semantic dependency parser;
   selecting, by the processor based on the executable logical form, at least one data source and at least one location service from the plurality heterogeneous data sources and location services, the at least one location service and at least one data source containing data relevant to the location-based query based on the stored meta-data, wherein the at least one data source comprises at least a location graph;
   generating and implementing, by the processor, an execution strategy for searching the at least one location service and the at least one data source, wherein the execution strategy filters and restructures at least one call tree to reduce the size and cardinality of at least one intermediate result;
   logging, by the processor, parameters for the implemented execution strategy, wherein the at least one location service or the at least one data source is selected based on previously logged parameters;
   providing, by the processor, results generated as a result of the execution strategy; and
   receiving, by the processor, feedback for the results, wherein the at least one location service and the at least one data source is selected based on previous feedback.

2. The method of claim 1, wherein the at least one data source or the at least one location service is selected based on a location reference included in the executable logical form.

3. The method of claim 1, wherein the parameters comprise access costs, past performance, and user feedback of result selection.

4. The method of claim 1, wherein selecting comprises: identifying, using the executable logical form generated with the ontology, at least a query type for the location-based query; and selecting, by the processor, the at least one data source or at least one location service based on the query type.

5. The method of claim 1, wherein the at least one location service comprises at least a routing service.

6. The method of claim 1, wherein the execution strategy comprises a hierarchy of dependent services and sources.

7. The method of claim 1, wherein the results comprise one or more points of interest.

8. A system for location-based searching across plurality of heterogeneous data sources and location services, the system comprising:
   at least one computer processor; and at least one memory;
   a computerized search interface to receive a location-based query;
   a service registry to store meta-data for the plurality of heterogeneous data sources and location services;
   a location-based ontology to generate an executable logical form for the location-based query, wherein the generating comprises processing and transforming the location-based query into the executable logical form via a pipeline of a machine-learned semantic dependency parser;
   a service selector to select at least one data source and at least one location service from the plurality of heterogeneous data sources and location services for the location-based query, the at least one location service and at the least one data source containing data relevant to the location-based query based on the stored meta-data, wherein the at least one data source comprises at least a location graph;
   an execution planner to generate an execution strategy for searching the one or more data sources and the one or more location services;
   an executor to implement the execution strategy, wherein the execution strategy filters and restructures at least one call tree to reduce the size and cardinality of at least one intermediate result;
   a data logger to log parameters for the implemented execution strategy, wherein the at least one location service or the at least one data source is selected based on previously logged parameters;
   a ranker to rank results from the executor;
   a receiver to receive feedback for the results, wherein the at least one location service and the at least one data source is selected based on previous feedback.

9. The system of claim 8, wherein the ontology further comprising a semantic meaning for the location-based query.

10. The system of claim 8, wherein the parameters comprise at least one of access costs, past performance, or user feedback of result selection.

11. The system of claim 8, wherein the at least one location service comprises at least a routing service.

12. The system of claim 8, wherein the ranker is configured to rank results from the executor based on a relevancy and a distance for each result from a location reference derived from the location-based query.

13. An apparatus comprising:
   at least one computer processor; and
   at least one memory including computer program code for one or more programs;
   the at least one memory configured to store the computer program code configured to, with the at least one processor, cause the at least one processor to:
   store meta-data for a plurality of heterogeneous data sources and location services;
   receive a location-based query;
   generate an executable logical form for the location-based query using a location-based ontology, wherein the generating comprises processing and transforming the location-based query into the executable logical form via a pipeline of a machine-learned semantic dependency parser;
   select, based on at least a location reference included in the executable logical form, at least one data source and at least one location service from a plurality heterogeneous data sources and location services, the at least one location service or data source containing data relevant to the location-based query based on the stored meta-data, wherein the at least one data source comprises at least a location graph;
   generate an execution strategy for searching the at least one location service and the at least one data source;

implement the execution strategy, wherein the execution strategy filters and restructures at least one call tree to reduce the size and cardinality of at least one intermediate result;

logging parameters for the implemented execution strategy, wherein the at least one location service or the at least one data source is selected based on previously logged parameters; and provide results generated as a result of the execution strategy;

wherein the at least one location service or the at least one data source is selected based on previous feedback.

14. The apparatus of claim 13, wherein the at least one location service comprises at least a routing service.

* * * * *